April 18, 1933.  A. H. KENNEDY  1,904,898
FLUSH VALVE
Filed April 9, 1930
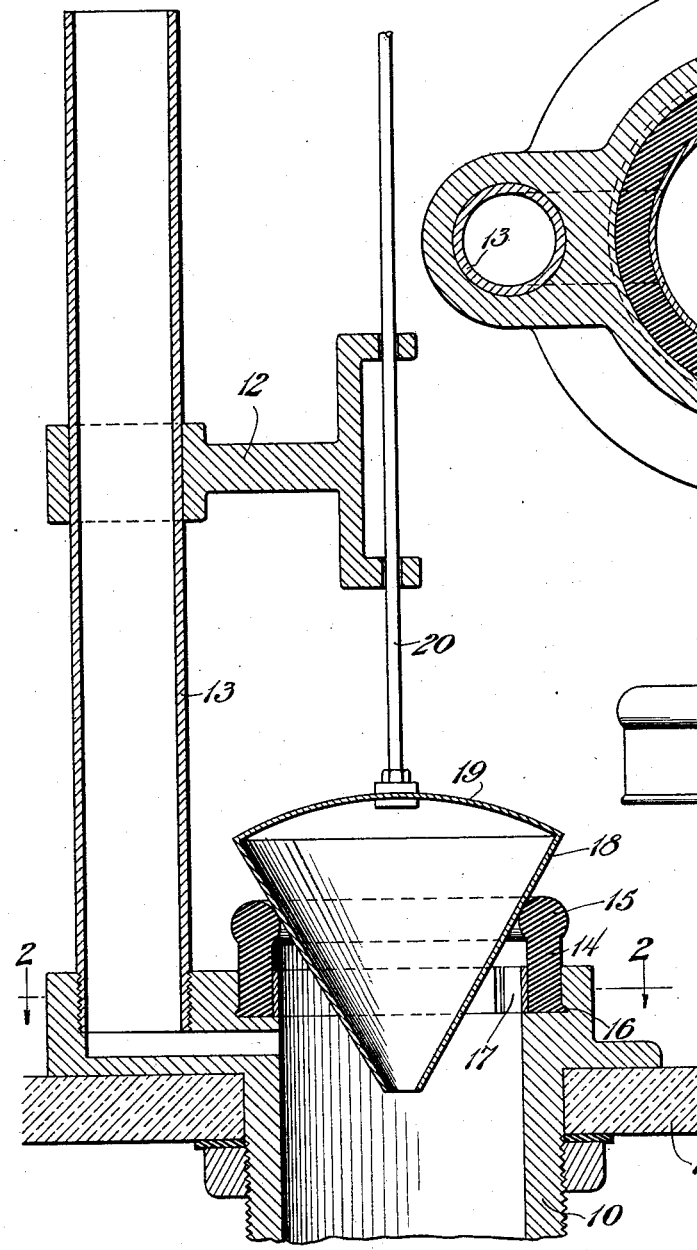
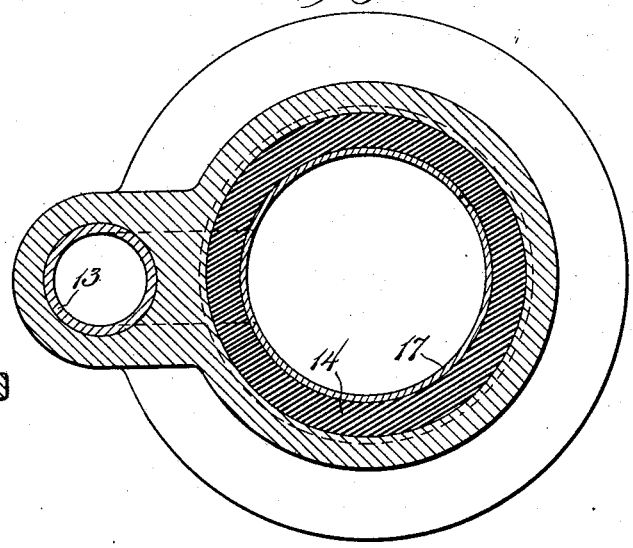
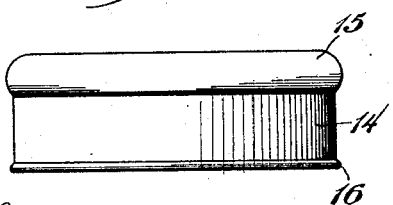
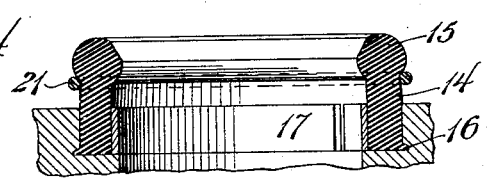
INVENTOR
A. H. Kennedy
BY Siggers & Adams
ATTORNEYS Patented Apr. 18, 1933

1,904,898

UNITED STATES PATENT OFFICE

ALBERT H. KENNEDY, OF ROCKPORT, INDIANA

FLUSH VALVE

Application filed April 9, 1930. Serial No. 442,836.

This invention relates to flushing valves for flush tanks and aims to provide an improved relatively simple and inexpensive valve installation having a novel valve member and a removable seat of yieldable elastic material adapted to be replaced at a small fraction of the cost of a new valve.

In the accompanying drawing:

Fig. 1 is a fragmentary sectional view showing a valve embodying the invention;

Fig. 2 is a sectional view taken on the line 2—2 of Fig. 1;

Fig. 3 is a side elevation of the seat member shown in Fig. 1; and

Fig. 4 is a fragmentary sectional view showing a reinforcing band applied to the seat.

Referring particularly to the drawing, the improved valve there shown is mounted in an outlet pipe 10 connected to an ordinary tank 11 in the usual manner, the valve being guided by a suitable bracket 12 secured to an overflow pipe 13, which drains into the outlet conduit as shown in Fig. 1.

In this example, the valve seat comprises a soft, elastic rubber ring 14 in the form of a cylinder conveniently mounted in a counterbore in the mouth of the outlet conduit 10 and projects above the mouth, presenting a rounded annular bead 15. In some instances, the upper, inner edge of the ring may be beveled or upwardly and outwardly flared. The lower end is here shown as having a small external bead 16 snapped into an annular groove in the bottom of the side wall of the counterbore (Fig. 1). The ring is preferably expanded into its seat to make it watertight by means of a split spring ring 17.

Co-operating with the elastic seat, there is shown a frusto-conical valve 18 which is preferably made of bronze or other rust-proof sheet metal. This valve has a taper of at least sixty degrees and is adapted to seat against the inside of the bead 15. The taper is such that the valve upon seating itself will slightly expand the rubber ring or seat and make a tight seal. Further, the soft rubber bead will yield sufficiently to conform to any inequalities in the frusto-conical surface of the valve. Moreover, the water pressure on the outside of the rubber ring acts to compress it against the valve and further insure a tight seal when the tank is filled.

The valve is here shown as having a dome-shaped top wall 19 to which is connected the usual operating arm or stem 20 guided in spaced openings in the bracket 12. The operating mechanism (not shown) may be of any well known design.

As the valve seat wears, the valve will seat deeper into it and present a new seating surface until the rubber ring is practically worn out. The wearing action on the inner edge of the bead will produce a beveled seating surface which makes a better seal. After the rubber has lost some of its elasticity, an elastic member, such as a reinforcing rubber band 21 may be stretched around its upper end (Fig. 4) so as to squeeze it inwardly and increase its life. Thus, the seat will last much longer than thin tapered seats. When a seat is completely worn out, a new molded rubber ring to replace it can be purchased at a small fraction of the cost of the ordinary rubber bulbs now in use and will last much longer. Further, the ring can be replaced very easily and quickly without taking out the valve.

Obviously, the present invention is not restricted to the particular embodiment thereof herein shown and described.

What is claimed is:

In a flush tank, an outlet conduit having a cylindrical counterbore and an annular groove adjacent to the bottom of the counterbore; a cylindrical seat member of flexible and yieldable material having an external bead adapted to snap into said groove when the seat member is forced into the bottom of the counterbore; an enlarged, reinforcing bead on the upper end of the seat to receive a tapered valve; and spring means to lock the seat member in the counterbore.

In testimony that I claim the foregoing as my own, I have hereto affixed my signature.

ALBERT H. KENNEDY.